United States Patent
Wu et al.

(10) Patent No.: US 7,157,072 B2
(45) Date of Patent: Jan. 2, 2007

(54) CATHODE COMPOSITION FOR LITHIUM BATTERIES AND METHOD OF PREPARING THE SAME

(75) Inventors: Xianglan Wu, Daejeon (KR); Yong Joon Park, Daejeon (KR); Kwang Sun Ryu, Daejeon (KR); Soon Ho Chang, Daejeon (KR)

(73) Assignee: Electronics and Telecommunications Research Institute (KR)

( * ) Notice: Subject to any disclaimer, the term of this patent is extended or adjusted under 35 U.S.C. 154(b) by 261 days.

(21) Appl. No.: 10/886,077

(22) Filed: Jul. 6, 2004

(65) Prior Publication Data

US 2005/0069772 A1 Mar. 31, 2005

(30) Foreign Application Priority Data

Sep. 26, 2003 (KR) ............... 10-2003-0066949

(51) Int. Cl.
C01B 13/00 (2006.01)
(52) U.S. Cl. ............... 423/593.1; 423/596; 423/598; 423/599; 423/594.15; 423/49; 423/50; 423/53; 423/55; 423/58; 423/69; 423/71; 423/84; 423/179.5; 423/184; 423/85; 429/224; 429/231.1; 429/231.5; 429/231.95
(58) Field of Classification Search ............... 423/593.1, 423/596, 598, 599, 594.15, 49, 50, 53, 55, 423/58, 69, 71, 84, 179.5, 184, 85; 429/224, 429/231.1, 231.5, 85, 231.95
See application file for complete search history.

(56) References Cited

U.S. PATENT DOCUMENTS 6,361,756 B1* 3/2002 Gao et al. ............... 423/599
6,670,076 B1* 12/2003 Iwata et al. ............. 429/231.95
6,713,037 B1* 3/2004 Van Neste ............. 423/594.15
6,753,110 B1* 6/2004 Yoo et al. ............... 429/231.95
6,908,708 B1* 6/2005 Wu et al. ................. 429/224
6,924,064 B1* 8/2005 Kondo et al. ........... 429/231.95
6,960,335 B1* 11/2005 Singhal et al. ........... 423/599
6,986,968 B1* 1/2006 Hong et al. ............. 429/221
7,008,608 B1* 3/2006 Park et al. ............. 423/594.6
2002/0114995 A1 8/2002 Thackeray et al.
2002/0136954 A1 9/2002 Thackeray et al.
2003/0027048 A1 2/2003 Lu et al.
2003/0087154 A1 5/2003 Ohzuku et al.
2004/0023113 A1* 2/2004 Suhara et al. ........... 429/231.1

OTHER PUBLICATIONS

"The role of Li2MO2 structures (M=metal ion) in the electrochemistry of (x) LiMn0.5O2 (1-x) Li2TiO3 electrodes for lithium-ion batteries", C. Johnson, et al., 2002 Published by Elsevier Science B.V., 7 pages.

* cited by examiner

Primary Examiner—Timothy C. Vanoy
(74) Attorney, Agent, or Firm—Blakely Sokoloff Taylor & Zafman

(57) ABSTRACT

Provided is a cathode composition for lithium secondary battery that includes a lithium-chromium-titanium-manganese oxide that has the formula $Li[Li_{(1-x)/3}Cr_xTi_{(2/3)y}Mn_{2(1-x-y)/3}]O_2$ where $0 \leq x \leq 0.3$, $0 \leq y \leq 0.3$ and $0.1 \leq x+y \leq 0.3$, and layered a-LiFeO$_2$ structure. A method of synthesizing the lithium-chromium-titanium manganese oxide includes preparing a first mixed solution by dispersing titanium dioxide (TiO$_2$) in a mixed solution of chrome acetate (Cr$_3$(OH)$_2$(CH$_3$CO$_2$)$_7$) and manganese acetate ((CH$_3$CO$_2$)$_2$Mn.4H$_2$O), adding a lithium hydroxide (LiOH) solution to the first mixed solution to obtain homogeneous precipitates, forming precursor powder that has the formula $Li[Li_{(1-x)/3}Cr_xTi_{(2/3)y}Mn_{2(1-x-y)/3}]O_2$ where $0 \leq x \leq 0.3$, $0 \leq y \leq 0.3$ and $0.1 \leq x+y \leq 0.3$ by heating the homogeneous precipitates, and heating the precursor powder to form oxide powder having a layered structure.

9 Claims, 5 Drawing Sheets

CATHODE COMPOSITION FOR LITHIUM BATTERIES AND METHOD OF PREPARING THE SAME

BACKGROUND OF THE INVENTION

This application claims the priority of Korean Patent Application No. 2003-66949, filed on Sep. 26, 2003, in the Korean Intellectual Property Office, the disclosure of which is incorporated herein in its entirety by reference.

1. Field of the Invention

The present invention related to a cathode composition for lithium secondary battery and a method of preparing the same, particularly, related to the cathode composition consists of lithium-chromium-titanium-manganese oxides with layered $\alpha$-LiFeO$_2$ structure.

2. Description of the Related Art

There have been considerable works on substituting Mn$^{4+}$ in Li$_2$MnO$_3$ with Ni, Co, Cr, or Ti partially in the development of cathode materials for lithium batteries, as disclosed in U.S. Patent Publication No. 2002/0114995 A1. However, those manganese-based layered oxides exhibited insufficient capacity for commercialization, for example, $xLi_2TiO_3 \cdot (1-x)LiNi_{0.5}Mn_{0.5}O_2$ ($x \leq 0.1$) prepared by conventional method showed only 140 mAh/g capacity.

Recently, the synthesis of a novel lithium-nickel-manganese oxide, $xLiNiO_2 \cdot (1-x)Li_2MnO_3$, with a high capacity of 230 mAh/g disclosed in U.S. Patent Publication No. 2003/0027048 A1. However, the material exhibited a wide range of discharge voltage, from 4.6 to 3.0 V, which may result in voltage fluctuation when it was used commercially. On the other hand, $xLiNiO_2 \cdot (1-x)Li_2MO_3$ (M=Mn or Ti, $\frac{1}{3} \leq x \leq \frac{1}{2}$) material that was reported to have possible application in secondary lithium battery is too expensive to use due to the high cost of Ni.

SUMMARY OF THE INVENTION

Present invention provides a cathode composition consists of layered lithium-chromium-titanium-manganese oxides. The material exhibited flat discharge curves on extended cycles when used as a cathode in lithium batteries.

The present invention provides a simple mass production method for a cathode material that gives high discharge capacity at low costs.

According to an aspect of the present invention, there is provided a cathode composition for a lithium secondary battery, the cathode composition comprising a lithium-chromium-titanium-manganese oxide that has the formula $Li[Li_{(1-x)/3}Cr_xTi_{(2/3)y}Mn_{2(1-x-y)/3}]O_2$ where $0 \leq x \leq 0.3$, $0 \leq y \leq 0.3$ and $0.1 \leq x+y \leq 0.3$.

According to another aspect of the present invention, there is provided method of preparing a cathode composition for a lithium secondary battery, the method comprising preparing a first mixed solution by dispersing titanium dioxide (TiO$_2$) in a mixed solution of chrome acetate (Cr$_3$(OH)$_2$(CH$_3$CO$_2$)$_7$) and manganese acetate tetrahydrate ((CH$_3$CO$_2$)$_2$Mn.4H$_2$O). Next, a lithium hydroxide (LiOH) aqueous solution is added to the first mixed solution to obtain homogeneous precipitates. Precursor powder that has the formula $Li[Li_{(1-x)/3}Cr_xTi_{(2/3)y}Mn_{2(1-x-y)/3}]O_2$ where $0 \leq x \leq 0.3$, $0 \leq y \leq 0.3$ and $0.1 \leq x+y \leq 0.3$ is formed by heating the homogeneous precipitates, and the precursor powder is heated to form oxide powder that has a layered structure.

The forming of the precursor powder may comprise firing the homogeneous precipitates on a hot plate by heating the homogeneous precipitates. In this case, the homogeneous precipitates may be fired after coating a titanium foil with the homogeneous precipitates.

The heating of the precursor powder may comprise performing a first thermal process on the precursor powder at a first temperature ranging from 650° C. to 700° C. Next, a second thermal process is performed on the first thermally processed oxide powder at a second temperature that is higher than the first temperature. The second thermal process may be performed in an atmospheric condition at a temperature ranging from 900° C. to 1000° C. The method of preparing a cathode composition for a lithium secondary battery according to the present invention may further comprise grinding the first thermally processed oxide powder prior to performing the second thermal process. The oxide power after the second thermal process may be quenched.

A cathode composition for lithium secondary batteries according to the present invention that has the formula $Li[Li_{(1-x)/3}Cr_xTi_{(2/3)y}Mn_{2(1-x-y)/3}]O_2$ where $0 \leq x \leq 0.3$, $0 \leq y \leq 0.3$ and $0.1 \leq x+y \leq 0.3$ provides a flat discharge curve and a large discharge capacity independent of charging/discharging cycles. Therefore, lithium secondary batteries with small voltage fluctuation can be manufactured from the cathode composition according to the present invention. The method of preparing the above cathode composition according to the present invention allows mass production of the oxide compounds at low costs.

BRIEF DESCRIPTION OF THE DRAWINGS

The above aspects and advantages of the present invention will become more apparent by describing in detail exemplary embodiments thereof with reference to the attached drawings in which.

DETAILED DESCRIPTION OF THE INVENTION

A cathode composition for lithium secondary batteries according to the present invention includes a lithium-chromium-titanium-manganese oxide that has the formula $Li[Li_{(1-x)/3}Cr_xTi_{(2/3)y}Mn_{2(1-x-y)/3}]O_2$ where $0 \leq x \leq 0.3$, $0 \leq y \leq 0.3$ and $0.1 \leq x+y \leq 0.3$.

When a lithium-chromium-titanium-manganese oxide with $0.1 \leq x+y \leq 0.2$ in the above formula is used as a cathode composition for a lithium secondary battery, the lithium secondary battery has a flat discharge curve at 3.2 V independent of cycles and a great discharge capacity of 200 mAh/g even after 80 cycles at room temperature. Since Mn and Ni are present as 4+ ions in the above formula, a layered α-LiFeO$_2$ structure of the oxide remains without transformation into a spinel structure during cycling.

Figure 1:
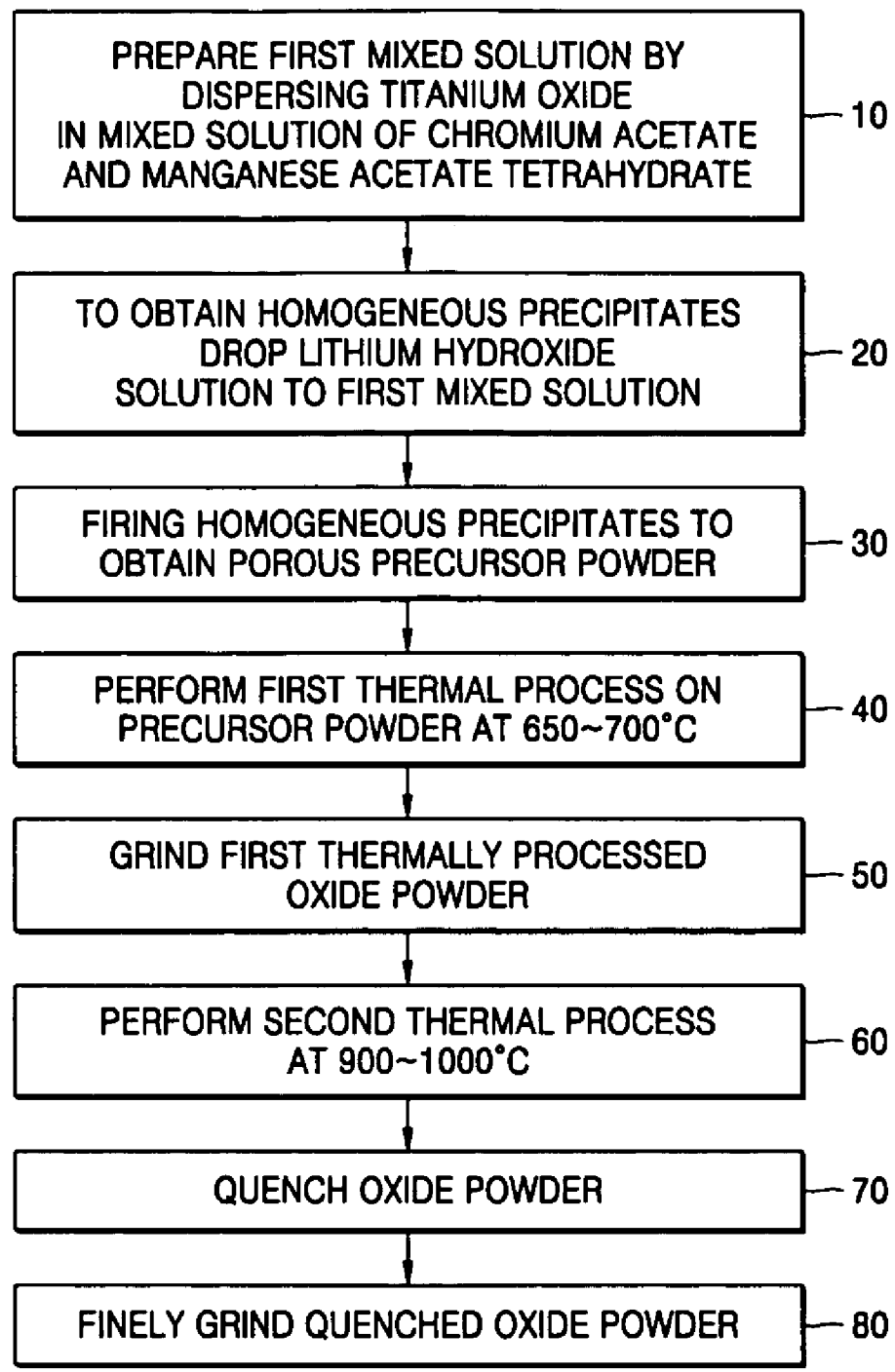
FIG. 1 is a flowchart illustrating a method of preparing a lithium-chromium-titanium-manganese oxide that is a cathode composition for lithium secondary batteries according to an embodiment of the present invention.

FIG. 1 is a flowchart illustrating a method of preparing a cathode composition for lithium secondary batteries that has the formula Li[Li$_{(1-x)/3}$Cr$_x$Ti$_{(2/3)y}$Mn$_{2(1-x-y)/3}$]O$_2$ where $0 \leq x \leq 0.3$, $0 \leq y \leq 0.3$ and $0.1 \leq x+y \leq 0.3$, according to an embodiment of the present invention.

Referring to FIG. 1, a first mixed solution is prepared by dispersing titanium oxide (TiO$_2$) in a mixed solution of chrome acetate (Cr$_3$(OH)$_2$(CH$_3$CO$_2$)$_7$) and manganese acetate tetrahydrate ((CH$_3$CO$_2$)$_2$Mn.4H$_2$O) (step 10). In particular, stoichiometric amounts of chrome acetate (Cr$_3$(OH)$_2$(CH$_3$CO$_2$)$_7$) and manganese acetate tetrahydrate ((CH$_3$CO$_2$)$_2$Mn.4H$_2$O) are initially dissolved in distilled water, and a stiochiometric amount of titanium oxide (TiO$_2$) is dispersed in the mixed solution while stirring.

A stoichiometric amount of lithium hydroxide (LiOH) aqueous solution is added to the first mixed solution while stirring to obtain homogeneous precipitates (step 20). The homogeneous precipitates have the composition of Li[Li$_{(1-x)/3}$Cr$_x$Ti$_{(2/3)y}$Mn$_{2(1-x-y)/3}$]O$_2$ where $0.1 \leq x+y \leq 0.3$, preferably, where Li[Li$_{(1-x)/3}$Cr$_x$Ti$_{(2/3)y}$Mn$_{2(1-x-y)/3}$]O$_2$ where $0 \leq x \leq 0.3$, $0 \leq y \leq 0.3$ and $0.1 \leq x+y \leq 0.2$. If x+y is less than 0.1, a battery manufactured from the composition has a smaller discharge capacity of 120 mAh/g or less. If x+y is greater than 0.3, the discharge curve of the battery has a narrower flat range.

Porous precursor powder is obtained when the homogeneous precipitates obtained in step 20 catch fire (step 30). In particular, the homogeneous precipitates are heated to remove water that remains therein, and a resulting product is coated on a titanium foil and heated on a hot plate. As the water in the precipitates is fully removed, the precipitates catch fire due to an acetate group (—COOH) that exists in the precipitates. As a result of the fire, the porous oxide powder is formed from the generation of gases.

The precursor oxide power obtained in step 30 is subjected to a first thermal process for about 3 hours at a first temperature $T_1$ that ranges from about 650° C. to 700° C. (step 40). As a result of this first thermal process (pre-firing), organic substance that remains in the precursor powder is fully decomposed so that the precursor powder is partially transformed into a layered structure.

The pre-fired oxide powder is ground (step 50) and annealed in a general atmospheric condition at a second temperature $T_2$, which is higher than the first temperature $T_1$, for about 12 hours in air (step 60). The second temperature $T_2$ may range from about 900° C. to 1000° C. As a result of this second thermal process, the oxide power has single-phase α-LiFeO$_2$ crystals in a perfectly layered structure.

After the second thermal process, the oxide is quenched (step 70) and finely ground into a lithium-chromium-titanium-manganese oxide that has the composition defined above (step 80).

Hereinafter, an example of synthesizing a cathode composition for lithium secondary batteries according to the present invention, which contains a lithium-chromium-titanium-manganese oxide, will now be described.

SYNTHESIS EXAMPLE

Stoichiometric amounts of chromium acetate hydroxide (Cr$_3$(OH)$_2$(CH$_3$CO$_2$)$_7$), titanium dioxide (TiO$_2$), manganese acetate tetrahydrate ((CH$_3$CO$_2$)$_2$Mn.4H$_2$O), and lithium hydroxide (LiOH) were individually dissolved or dispersed in distilled water. The amounts of the above reagents in the synthesized oxides were as follows:

Composition (1), Li[Li$_{0.30}$Cr$_{0.10}$Ti$_{0.07}$Mn$_{0.53}$]O$_2$, was synthesized from 11.13 g of LiOH, 26.39 g of (CH$_3$CO$_2$)$_2$Mn.4H$_2$O, 4.33 g of Cr$_3$(OH)$_2$(CH$_3$CO$_2$)$_7$, and 1.08 g of TiO$_2$;

Composition (2), Li[Li$_{0.27}$Cr$_{0.20}$Ti$_{0.07}$Mn$_{0.46}$]O$_2$, was synthesized from 10.87 g of LiOH, 23.12 g of (CH$_3$CO$_2$)$_2$Mn.4H$_2$O, 8.67 g of Cr$_3$(OH)$_2$(CH$_3$CO$_2$)$_7$, and 1.08 g of TiO$_2$;

Composition (3), Li[Li$_{0.30}$Cr$_{0.10}$Ti$_{0.10}$Mn$_{0.50}$]O$_2$, was synthesized from 11.13 g of LiOH, 23.12 g of (CH$_3$CO$_2$)$_2$Mn.4H$_2$O, 4.33 g of Cr$_3$(OH)$_2$(CH$_3$CO$_2$)$_7$, and 1.61 g of TiO$_2$; and Composition (4), Li[Li$_{0.32}$Cr$_{0.05}$Ti$_{0.03}$Mn$_{0.60}$]O$_2$, was synthesized from 11.27 g of LiOH, 29.69 g of (CH$_3$CO$_2$)$_2$Mn.4H$_2$O, 2.17 g of Cr$_3$(OH)$_2$(CH$_3$CO$_2$)$_7$, and 0.54 g of TiO$_2$.

A sufficient amount of distilled water was used to dissolve each of the reagents. In the preparation of the above compositions, lithium hydroxide was dissolved in about 70 mL of distilled water, while chromium acetate and manganese acetate were dissolved in about 60 mL of distilled water. Titanium dioxide was added to the mixed solution of chromium and manganese acetate. Then the mixture was stirred at room temperature until the titanium dioxide was dispersed throughout. To obtain homogeneous precipitates, the lithium hydroxide solution was slowly added to the above mixed oxide suspension with stirring.

The resulting precipitation solution was heated on a hot plate until it became viscous inorganic polymer. Then it was coated on a titanium foil and heated on hot plate to give porous powders. The powders were fired at 700° C. for 3 hours (first thermal process). The products from this first thermal process were ground, calcinated in an atmospheric condition at 900° C. for 12 hours or longer, and quenched to form desired oxides in α-LiFeO$_2$ phase.

Figure 2:
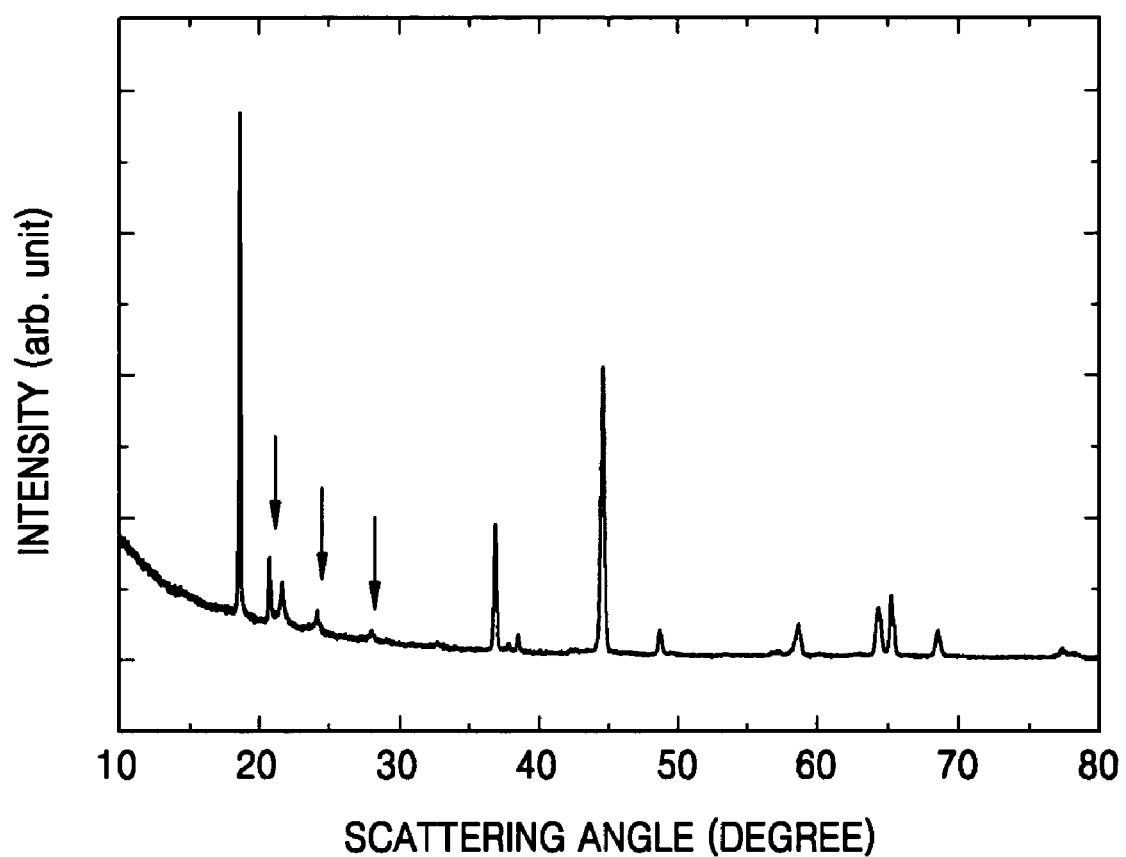
FIG. 2 illustrates an X-ray diffraction (XRD) pattern of a lithium-chromium-titanium-manganese oxide prepared using the method according to the present invention

FIG. 2 illustrates an X-ray diffraction (XRD) pattern of a lithium-chromium-titanium-manganese oxide prepared in the above synthesis example, which has the formula Li[Li$_{0.30}$Cr$_{0.10}$Ti$_{0.07}$Mn$_{0.53}$]O$_2$ where x+y=0.20. The XRD pattern supports the fact that the synthesized oxide has a layered structure.

Figure 3:
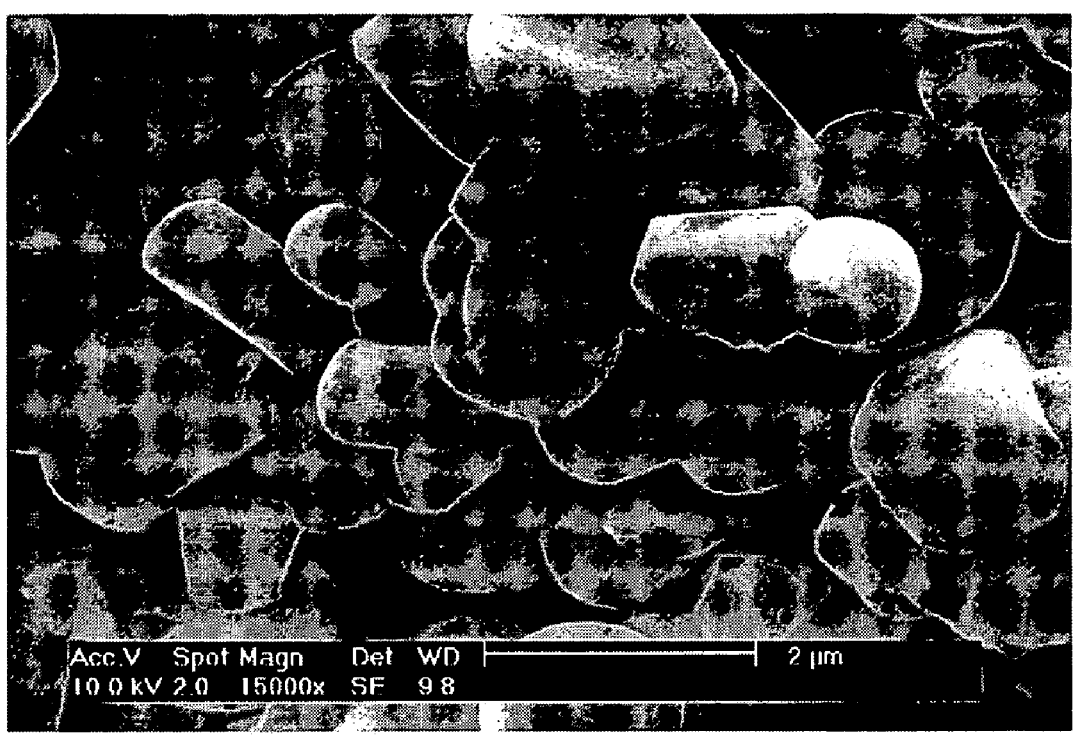
FIG. 3 is a scanning electron microscopic (SEM) photograph of the lithium-chromium-titanium-manganese oxide prepared using the method according to the present invention.

FIG. 3 is a scanning electron microscopic (SEM) photograph of the lithium-chromium-titanium-manganese oxide prepared in the above synthesis example, which has the formula Li[Li$_{0.30}$Cr$_{0.10}$Ti$_{0.07}$Mn$_{0.53}$]O$_2$ where x+y=0.20. As is apparent from FIG. 3, the synthesized oxide consists of equiaxed hexagonal particles.

Figure 4A:
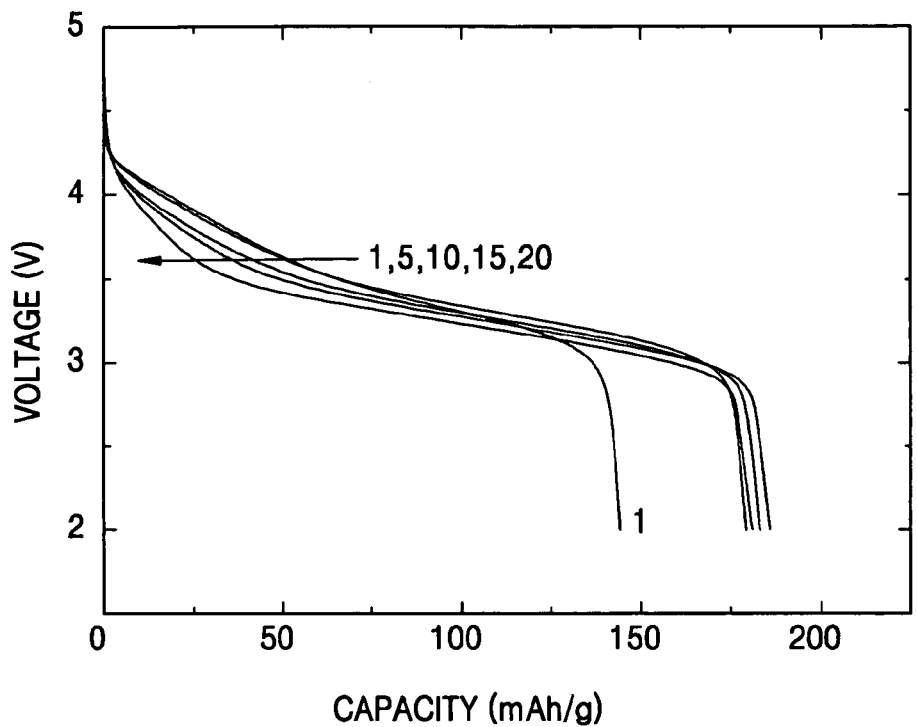
FIGS. 4A and 4B are graphs illustrating the discharge characteristics of lithium-chromium-titanium-manganese oxide $Li[Li_{0.30}Cr_{0.10}Ti_{0.07}Mn_{0.53}]O_2$ prepared using the method according to the present invention.
Figure 4B:
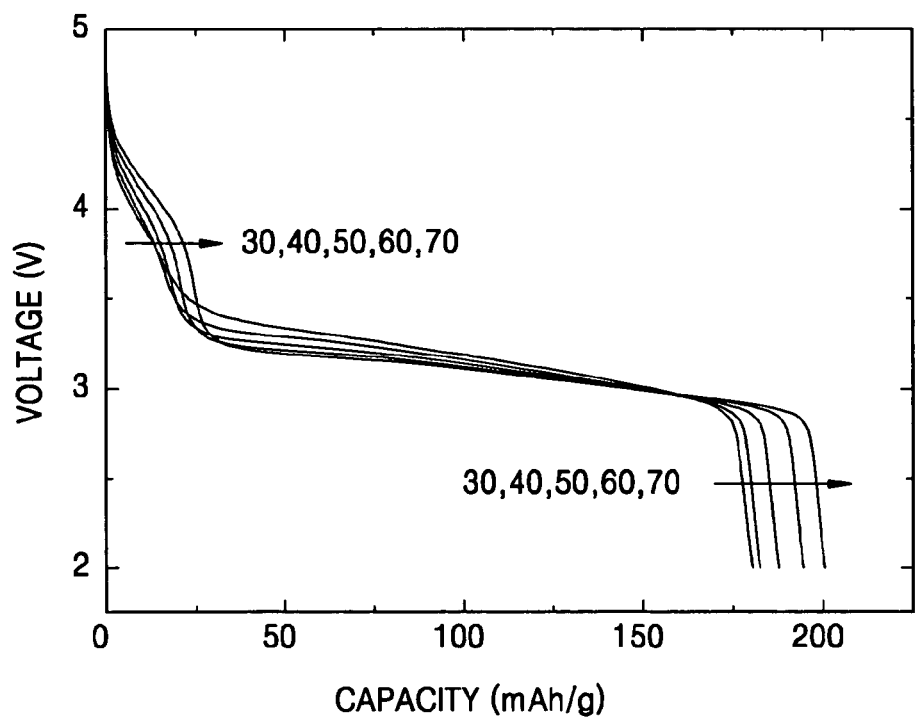

FIGS. 4A and 4B are graphs illustrating the discharge characteristics of the lithium-chromium-titanium-manganese oxide Li[Li$_{0.30}$Cr$_{0.10}$Ti$_{0.07}$Mn$_{0.53}$]O$_2$ prepared in the above synthesis example. Charge/discharge were carried out at a current of 13.2 mA/g in the voltage range of 2.0 V to 4.9 V. As shown in FIGS. 4A and 4B, the initial discharge capacity is about 145 mAh/g, however, the capacity increased to 200 mAh/g after 60 cycles. To obtain the graphs of FIGS. 4A and 4B, a cathode was prepared by mixing 85% of the synthesized oxide powder with 7.5% of a conducting agent and 7.5% of a binder by weight. A solution of 1M LiPF$_6$ salt dissolved in a 1:1 solvent mixture of ethylene carbonate (EC) and dimethyl carbonate (DMC) was used as an electrolyte. A lithium foil was used as an anode.

Figure 5:
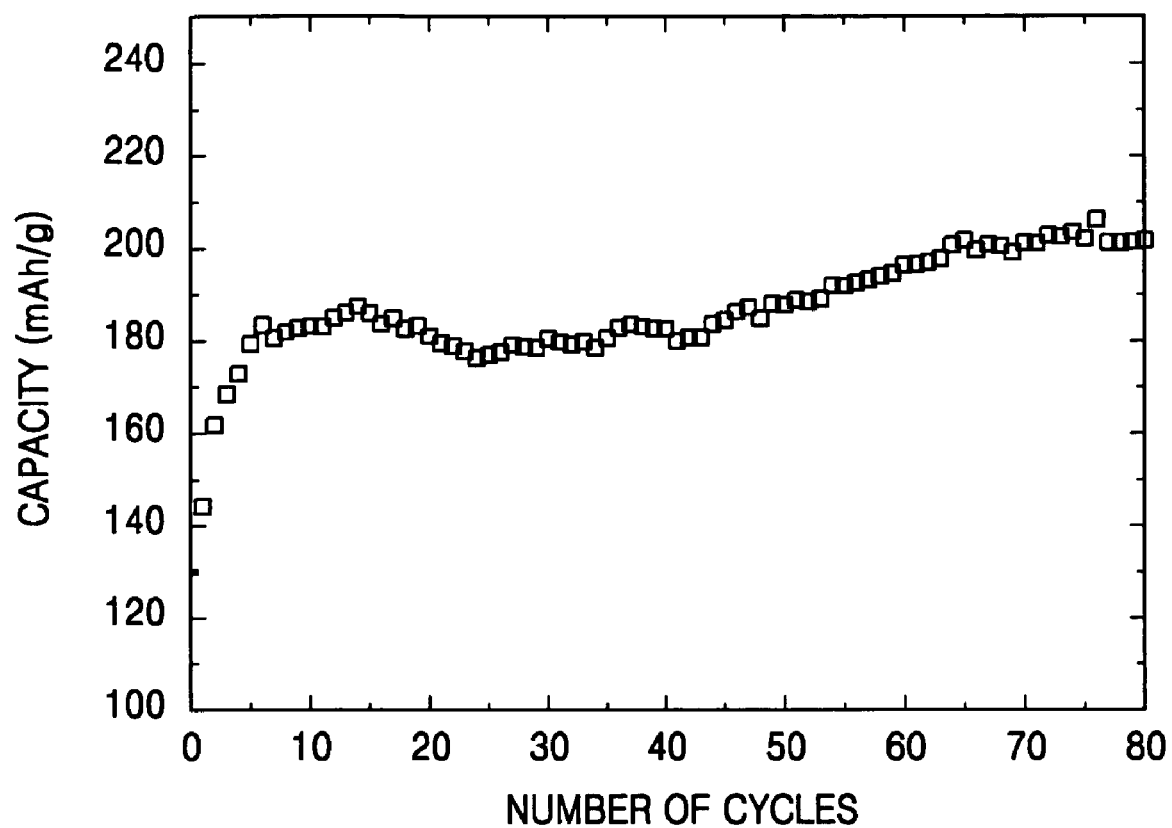
FIG. 5 illustrates a cycling behavior of lithium-chromium-titanium-manganese oxide $Li[Li_{0.30}Cr_{0.10}Ti_{0.07}Mn_{0.53}]O_2$ prepared using the method of the present invention.

FIG. 5 is a graph illustrating the cycling characteristics of the lithium-chromium-titanium-manganese oxide Li[Li$_{0.30}$Cr$_{0.10}$Ti$_{0.07}$Mn$_{0.53}$]O$_2$ prepared in the above synthesis example. As shown in FIG. 5, the cell sustained 200 mAh/g discharge capacity even after more than 80 cycles at a current density of 13.2 mA/g. The lithium-chromium-titanium-manganese oxide prepared in the synthesis example according to the present invention yields a much flatter discharge curve than previously reported lithium-manganese oxides that have layered structure and the capacity is also larger than $LiCoO_2$, which is known for having a flat discharge curve.

According to the present invention, lithium-chromium-titanium-manganese oxide with $Li[Li_{(1-x)/3}Cr_xTi_{(2/3)y}Mn_{2(1-x-y)/3}]O_2$ formula, where $0 \leq x \leq 0.3$, $0 \leq y \leq 0.3$ and $0.1 \leq x+y \leq 0.3$, has a layered a-$LiFeO_2$ structure. The lithium-chromium-titanium-manganese oxide with the above composition yields a flat discharge curve and a large discharge capacity on the extended cycles. Therefore, a lithium secondary battery with less fluctuation can be manufactured by using the oxide composition as a cathode material.

In the method of preparing the lithium-chromium-titanium-manganese oxide $Li[Li_{(1-x)/3}Cr_xTi_{(2/3)y}Mn_{2(1-x-y)/3}]O_2$ according to the present invention, transition metal acetate is used as a reactant, so that porous precursor powder can be obtained as a result of the combustion of the acetate group (—COOH) at an early reaction stage. The porous precursor powder facilitates the reaction at high temperature. Then the manganese-based oxide having layered structure can be mass produced at a low cost.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A cathode composition for a lithium secondary battery, the cathode composition comprising a lithium-chromium-titanium-manganese oxide that has the formula $Li[Li_{(1-x)/3}Cr_xTi_{(2/3)y}Mn_{2(1-x-y)/3}]O_2$ where $0<x \leq 0.3$, $0<y \leq 0.3$ and $0.1 \leq x+y \leq 0.3$.

2. A method of preparing a cathode composition for a lithium secondary battery, the method comprising:

preparing a first mixed solution by dispersing titanium dioxide ($TiO_2$) in a mixed solution of chrome acetate ($Cr_3(OH)_2(CH_3CO_2)_7$) and manganese acetate tetrahydrate (($CH_3CO_2)_2Mn \cdot 4H_2O$);

adding a lithium hydroxide (LiOH) aqueous solution to the first mixed solution to obtain homogeneous precipitates;

forming precursor powder that has the formula $Li[Li_{(1-x)/3}Cr_xTi_{(2/3)y}Mn_{2(1-x-y)/3}]O_2$ where $0<x \leq 0.3$, $0<y \leq 0.3$ and $0.1 \leq x+y \leq 0.3$ by heating the homogeneous precipitates; and heating the precursor powder to form oxide powder that has a layered structure.

3. The method of claim 2, wherein the forming of the precursor powder comprises firing the homogeneous precipitates on a hot plate by heating the homogeneous precipitates.

4. The method of claim 3, wherein the firing of the homogeneous precipitates is performed after coating a titanium foil with the homogeneous precipitates.

5. The method of claim 2, wherein the heating of the precursor powder comprises:

performing a first thermal process on the precursor powder at a first temperature ranging from 650° C. to 700° C.; and performing a second thermal process on the first thermally processed oxide powder at a second temperature that is higher than the first temperature.

6. The method of claim 5, wherein the second temperature ranges from 900° C. to 1000° C.

7. The method of claim 5, further comprising grinding the first thermally processed oxide powder prior to performing the second thermal process.

8. The method of claim 5, wherein the second thermal process is performed in an atmospheric condition.

9. The method of claim 5, further comprising quenching the second thermally processed oxide powder.

* * * * *